US006669345B2

(12) United States Patent
Yajima (10) Patent No.: US 6,669,345 B2
(45) Date of Patent: Dec. 30, 2003

(54) ILLUMINATION SYSTEM AND PROJECTOR (75) Inventor: Akitaka Yajima, Tatsuno-machi (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 10/229,031

(22) Filed: Aug. 28, 2002

(65) Prior Publication Data
US 2003/0025883 A1 Feb. 6, 2003

Related U.S. Application Data (63) Continuation of application No. 09/641,703, filed on Aug. 21, 2000, which is a continuation of application No. PCT/JP99/07130, filed on Dec. 17, 1999.

(30) Foreign Application Priority Data

Dec. 21, 1998 (JP) ........................ 10-362585(P)
Nov. 22, 1999 (JP) ........................ 11-331083(P)

(51) Int. Cl.⁷ ............................................. G03B 21/14
(52) U.S. Cl. ....................................................... 353/38
(58) Field of Search ........................... 353/38, 102, 31, 353/33, 34, 37, 20, 98, 99, 100, 101; 349/5, 8, 9

(56) References Cited

U.S. PATENT DOCUMENTS

| 3,302,517 | A | * | 2/1967 | Henkel ........................ 353/102 |
| 5,786,939 | A |   | 7/1998 | Watanabe |
| 5,997,143 | A | * | 12/1999 | Derra et al. ................... 353/38 |
| 6,120,153 | A | * | 9/2000 | Ohta ........................... 353/102 |
| 6,155,686 | A | * | 12/2000 | Hashizume .................... 353/38 |
| 6,246,526 | B1 | * | 6/2001 | Okuyama ..................... 353/31 |
| 6,257,726 | B1 | * | 7/2001 | Okuyama ..................... 353/20 |
| 6,286,961 | B1 | * | 9/2001 | Ogawa ........................ 353/38 |

FOREIGN PATENT DOCUMENTS

| EP | 0 395 156 A1 | 10/1990 |
| EP | 0 563 874 A1 | 10/1993 |
| EP | 0 819 966 A2 | 1/1998 |
| JP | 1-177525 | 7/1989 |
| JP | 1-246588 | 10/1989 |
| JP | 4-340919 | 11/1992 |
| JP | 5-333308 | 12/1993 |
| JP | 7-287229 | 10/1995 |
| JP | 9-101495 | 4/1997 |
| JP | 9-146064 | 6/1997 |
| JP | 9-146065 | 6/1997 |
| JP | 9-269470 | 10/1997 |
| JP | 9-269485 | 10/1997 |
| JP | 9-304772 | 11/1997 |
| JP | 10-39258 | 2/1998 |
| JP | 10-133143 | 5/1998 |
| JP | 10-133198 | 5/1998 |
| JP | 10-246868 | 9/1998 |
| JP | 10-288757 | 10/1998 |
| JP | 11-231416 | 8/1999 |

* cited by examiner

Primary Examiner—William Dowling
(74) Attorney, Agent, or Firm—Oblon, Spivak, McClelland, Maier & Neustadt, P.C.

(57) ABSTRACT

A projector including an illumination system that illuminates a modulation device modulating light according to image information. The illumination system includes a light source that emits a light beam along a light source optical axis, a first lens array having a plurality of small lenses which divide the light beam emitted from the light source into a plurality of partial light beams, a superimposing lens that superimposes the plurality of partial light beams emitted from the first lens array on the modulation device, and an entrance angle reducing system disposed between the superimposing lens and the modulation device. The entrance angle reducing system reduces an entrance angle of light rays, which are emitted from the superimposing lens and enter the modulation device, compared with an illumination system without the entrance angle reducing system.

23 Claims, 10 Drawing Sheets

ILLUMINATION SYSTEM AND PROJECTOR

CROSS-REFERENCE TO A RELATED APPLICATION

This application is related to Japanese Patent Application No. 10-362585 filed on Dec. 21, 1998, the entire contents of which are incorporated by reference.

BACKGROUND OF THE INVENTION

1. Field of the Invention

The present invention relates to an illumination system suitable for emitting illumination light to a light modulator, which modulates light according to image information, and to a projector that projects and magnifies the light from the illumination system modulated by the light modulator.

2. Discussion of the Background

Figure 10:
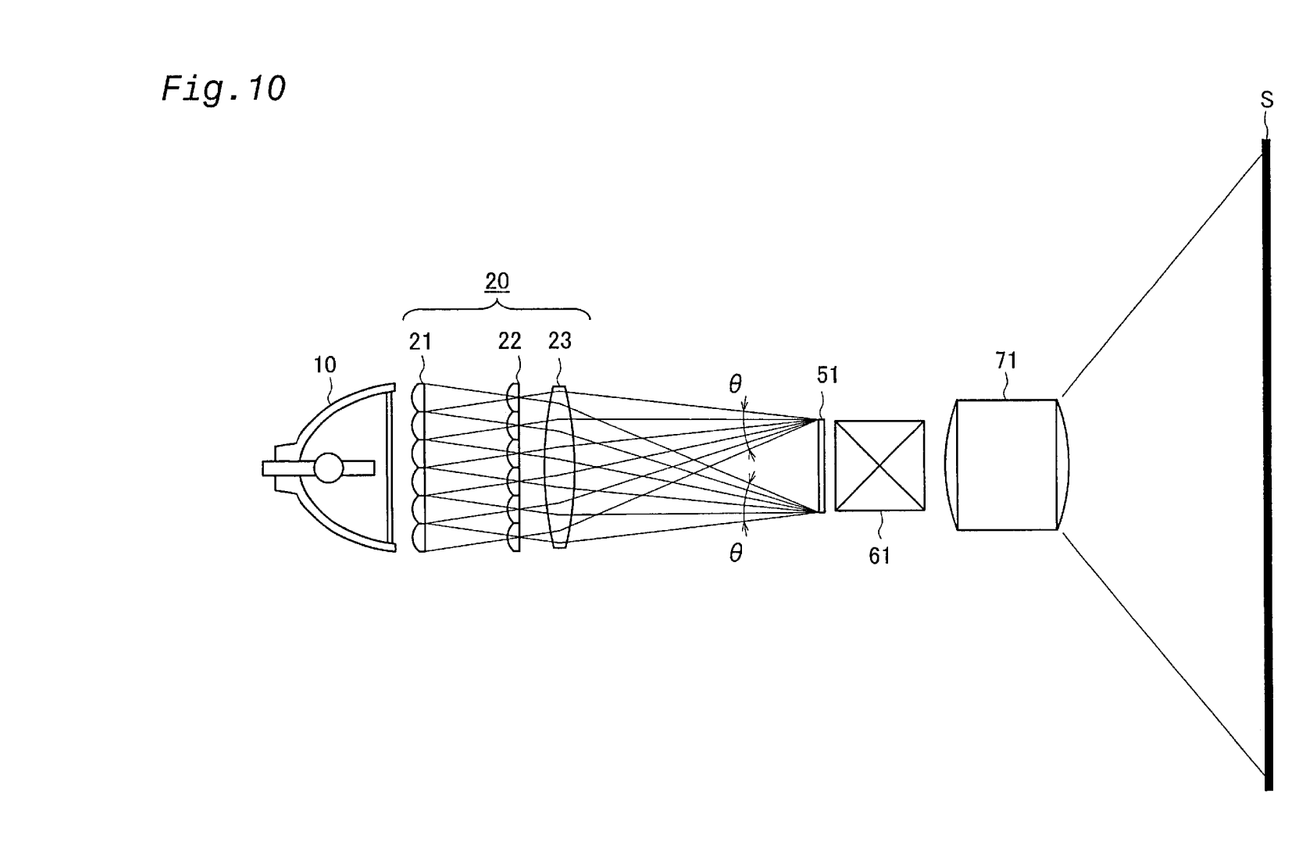
FIG. 10 illustrates a background projector.

FIG. 10 illustrates a background projector. A light beam emitted from a light source passes through a uniform illumination optical system 20 and is separated into three color light beams of red (R), green (G), and blue (B) by a non-illustrated color separation optical system. The three color light beams are respectively modulated according to image information by liquid crystal panels 51 for the respective colors (R, G, and B). The modulated three color light beams are synthesized to a composite light beam by means of a prism 61. The composite light beam is projected through a projection lens 71 onto a screen S for projection of a magnified image.

The uniform illumination optical system 20 includes a first lens array 21, a second lens array 22, and a condenser lens 23. The light beam emitted from the light source 10 is divided into a plurality of partial light beams by the first lens array 21. The partial light beams are superimposed on the liquid crystal panel 51 by the second lens array 22 and the condenser lens 23. Namely, the uniform illumination optical system 20 has a function of leveling the intensity of the light beams, with which the liquid crystal panel 51 is irradiated.

The optical characteristics of the liquid crystal panel 51 significantly depend upon the angle of the incident light ray. In the background projector using the uniform illumination optical system 20, the rays entering the liquid crystal panel 51 have a large angular difference (hereinafter this angular difference is referred to as the 'entrance angle θ'), which causes problems like chrominance nonuniformities of the projected image and lowered contrast.

There is a high possibility that the light ray having a large incident angle to the liquid crystal panel 51 can not enter the pupil of the projection lens and might reduce brightness of the projected image.

SUMMARY OF THE INVENTION

Accordingly, one object of the present invention is to provide an illumination system and a projector, which reduce the chrominance nonuniformities of a projected image and enhance the contrast, so as to give a bright projected image of high quality.

To achieve the above-noted and other objects, the present invention provides a first apparatus, which is an illumination system that illuminates a modulation device modulating light according to image information. The illumination system includes a light source that emits a light beam along a light source optical axis, a first lens array having a plurality of small lenses which divide the light beam emitted from the light source into a plurality of partial light beams, and a superimposing lens that superimposes the plurality of partial light beams emitted from the first lens array on the modulation device such that light intensity distribution is substantially uniform on the modulation device. Also included is an entrance angle reducing system disposed between the superimposing lens and the modulation device. The entrance angle reducing system reduces an entrance angle of light rays, which are emitted from the superimposing lens and enter the modulation device, compared with an illumination system without the entrance angle reducing system.

The illumination system of the present invention including the entrance angle reducing system reduces the entrance angle of the incident light rays that enter the modulation device. This arrangement effectively reduces the chrominance nonuniformities of an image reproduced by the beams emitted from the modulation device, and improves the contrast.

In the illumination system, it is preferable the superimposing lens and the entrance angle reducing system form a telephoto lens system which causes light rays entering the superimposing lens substantially in parallel with the light source optical axis to be converged on the modulation device. This arrangement facilitates the reduction of the entrance angle of the incident light rays that enter the modulation device.

In the illumination system discussed above, the entrance angle reducing system may include a concave lens or a meniscus lens. The concave lens or the meniscus lens forms in combination with the superimposing lens the telephoto lens system, thereby facilitating the reduction of the entrance angle.

The entrance angle reducing system may also include a convex mirror. The convex mirror used as the entrance angle reducing system also desirably reduces the entrance angle of the incident light rays that enter the modulation device. In the case where the illumination system includes a reflecting mirror that bends the optical path, the convex mirror also functions as the reflecting mirror. This arrangement thus favorably reduces the total number of parts.

In the illumination system, the superimposing lens may include a second lens array, having a plurality of small lenses corresponding to the small lenses of the first lens array. The second lens array may also include decentered small lenses.

The second array including the decentered small lenses functions as the superimposing lens. In the illumination system having a condenser lens as the superimposing lens, the use of the second lens array as the superimposing lens enables reduction of the thickness of the condenser lens and thereby of the weight of the illumination system.

In the illumination system, the light source may include a reflector having a parabolic reflecting surface. The reflector emits the light beam that travels while being converged along the light source optical axis. The superimposing lens may include a second lens array having a plurality of small lenses corresponding to the small lenses of the first lens array. Each small lens included in the second lens array may have dimensions smaller than the corresponding small lens in the first lens array. This arrangement desirably reduces the size of the illumination system.

In the illumination system discussed above, the light beam from the superimposing lens may be emitted to be converged as a whole, whereas the light beam from the entrance angle reducing system may be emitted to be a bundle of parallel light as a whole.

A second apparatus of the present invention is a projector including a light source that emits a light beam along a light source optical axis, a color separator that separates the light beam emitted from the light source into three color light beams, and first through third modulation devices that respectively modulate the three color light beams separated by the color separator according to image information. Also included is a color synthesizer that synthesizes beams modulated by the first through third modulation devices to a composite light beam, and a projection lens that projects and magnifies the composite light beam synthesized by the color synthesizer. The projector further includes a first lens array having a plurality of small lenses which divide the light beam emitted from the light source into a plurality of partial light beams, a superimposing lens that superimposes the plurality of partial light beams emitted from the first lens array on the first through third modulation devices such that light intensity distribution is substantially uniform on the first through third modulation devices, and an entrance angle reducing system disposed between the superimposing lens and the first through third modulation devices. The entrance angle reducing system reduces an entrance angle of light rays, which are emitted from the superimposing lens and enter the first through third modulation devices, compared with an illumination system without the entrance angle reducing system.

The projector of the present invention utilizes the illumination system similar to the first apparatus of the present invention, thereby reducing the entrance angle of the incident light rays that enter the first through the third modulation devices. This arrangement desirably reduces the chrominance nonuniformities of a projected and displayed image and improves the contrast.

In the projector, the color separator may have a first color separator that separates the light beam emitted from the light source into a first color light beam and a residual color light beam, and a second color separator that separates the residual color light beam into a second color light beam and a third color light beam. The entrance angle reducing system may have a first entrance angle reduction element that is disposed in an optical path of the first color light beam separated by the first color separator, and a second entrance angle reduction element that is disposed in an optical path of the residual color light beam separated by the first color separator.

The entrance angle reducing system, which includes a plurality of entrance angle reduction elements, also effectively reduces the entrance angle of the incident light rays that enter the first through the third modulation devices. In the projector, each of the modulation devices may be a liquid crystal panel, which includes a microlens array.

The angular difference of rays emitted from the liquid crystal panel, which includes the microlens array, is generally greater than the entrance angle of the incident light rays that enter the liquid crystal panel. The projector of the present invention has the entrance angle reducing system and thereby relatively reduces the angular difference of the rays emitted from the liquid crystal panel. This arrangement effectively prevents the brightness of the projected image from being lowered.

A third apparatus of the present invention is a projector, which includes an illumination system, a modulation device that modulates light emitted from the illumination system according to image information, and a projection lens that projects and magnifies the modulated light emitted from the modulation device. The illumination system includes a light source that emits a light beam along a light source optical axis, a first lens array having a plurality of small lenses which divide the light beam emitted from the light source into a plurality of partial light beams, a superimposing lens that superimposes the plurality of partial light beams emitted from the first lens array on the modulation device such that light intensity distribution is substantially uniform on the modulation device, and an entrance angle reducing system disposed between the superimposing lens and the modulation device. The entrance angle reducing system reduces an entrance angle of light rays, which are emitted from the superimposing lens and enter the modulation device, compared with an illumination system without the entrance angle reducing system. This projector has the similar functions and advantages to those of the projector discussed previously as the second apparatus of the present invention.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Various other objects, features and attendant advantages of the present invention will be more fully appreciated as the same becomes better understood from the following detailed description when considered in connection with the accompanying drawings in which like reference characters designate like or corresponding parts throughout the several views.

First Embodiment

Figure 1:
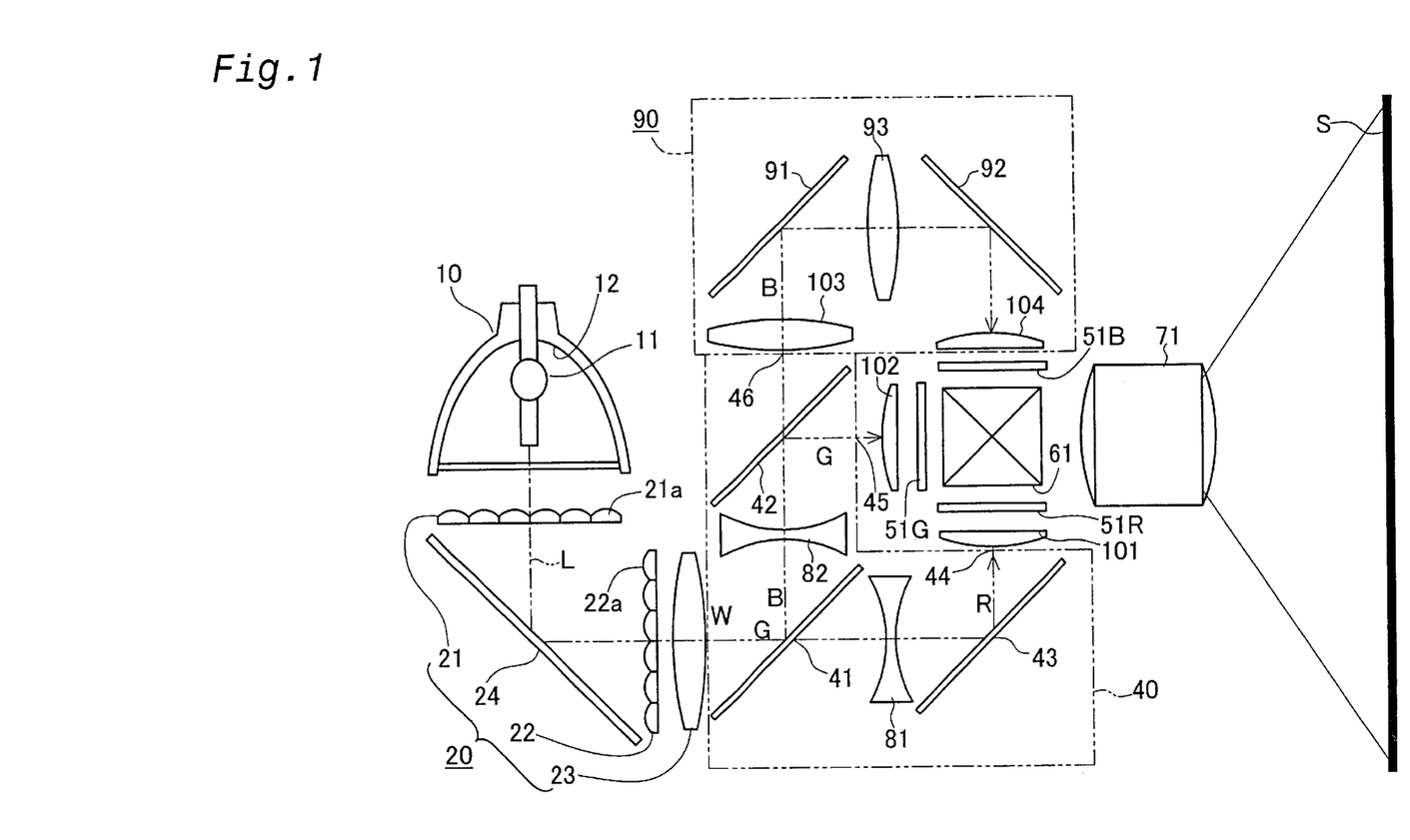
FIG. 1 schematically illustrates an illumination system and a projector in a first embodiment according to the present invention.
Figure 2:
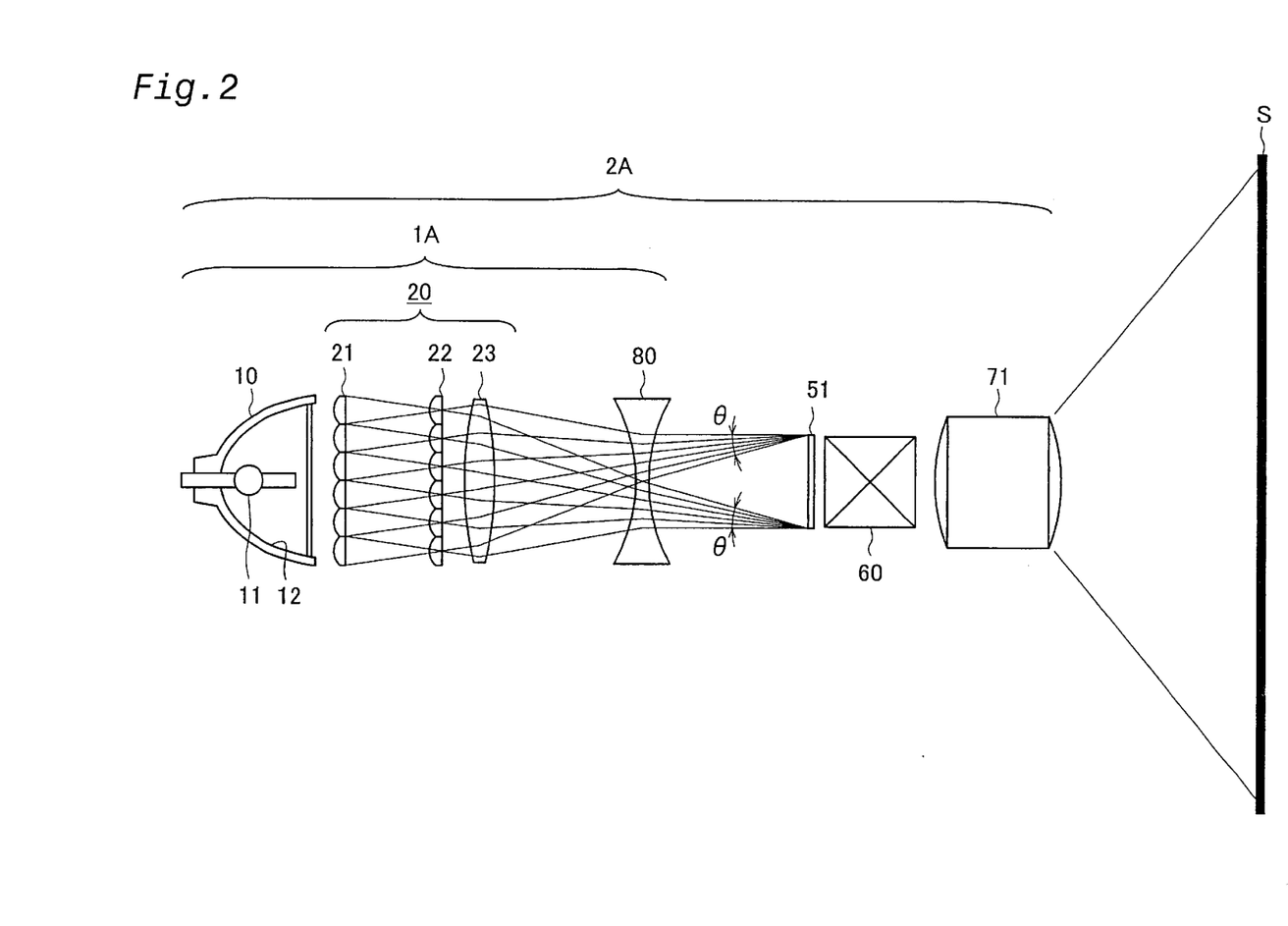
FIG. 2 shows the illumination system and the projector of the first embodiment as a simplified equivalent optical system.

FIG. 1 schematically illustrates an illumination system and a projector in a first embodiment according to the present invention. FIG. 2 shows the illumination system and the projector of the first embodiment as a simplified equivalent optical system. An illumination system 1A of the first embodiment (see FIG. 2) includes a light source 10, a uniform illumination optical system 20, and an entrance angle reducing optical system 80.

The light source 10 includes a light source lamp 11 and a curved reflecting mirror (reflector) 12 having a reflecting surface in a shape of paraboloid of revolution. Available examples of the light source lamp 11 include a halogen lamp, a metal halide lamp, and a xenon lamp.

The uniform illumination optical system 20 includes a first lens array 21, a second lens array 22, and a condenser lens 23. The uniform illumination optical system 20 divides the light beam emitted from the light source 10 into a plurality of partial light beams and causes the partial light beams to be superimposed on liquid crystal panels 51R, 51G, and 51B. The uniform illumination optical system 20 accordingly has the function of irradiating the liquid crystal panels 51R, 51G, and 51B with a substantially uniform illuminance.

The first lens array 21 has a plurality of rectangular lenses 21a arranged in a matrix. The first lens array 21 divides the light beam emitted from the light source 10 into a plurality of partial light beams and causes each of the partial light beams to be converged in the vicinity of the second lens array 22.

The second lens array 22 has a plurality of rectangular lenses 22a arranged in a matrix. The second lens array 22 has a function of causing the central optical path of each partial light beam emitted from the first lens array 21 to be in parallel with a light source optical axis L (a central axis of the light beam emitted from the light source). In the case where the light beam emitted from the light source 10 is a bundle of parallel light rays to the light source optical axis L, the partial light beams emitted from the first lens array 21 also have the central optical paths that are parallel to the light source optical axis. The second lens array 22 may be omitted when the light beam emitted from the light source has a high degree of parallelism.

In the uniform illumination optical system 20 of this embodiment, a reflecting mirror 24, which bends the light source optical axis L towards the front side of the projector (that is, towards a screen S), is disposed between the first lens array 21 and the second lens array 22 as shown in FIG. 1. The condenser lens 23 functioning as the superimposing lens is arranged on the light-outgoing side of the second lens array 22. The condenser lens 23 has the function of causing the respective partial light beams to be superimposed on the liquid crystal panels 51R, 51G, and 51B.

In this projector 2A, the function of the uniform illumination optical system 20 enables the liquid crystal panels 51R, 51G, and 51B to be irradiated with the light of substantially uniform illuminance, thereby obtaining a projected image that is free of the varying illuminance.

The entrance angle reducing optical system 80 has the function of reducing the 'entrance angle θ' of the rays emitted from the uniform illumination optical system 20 and enter the liquid crystal panels 51R, 51G, and 51B as shown in FIG. 2. The 'entrance angle θ' here represents the angular difference of the incident light rays that enter the liquid crystal panel. In the embodiment of FIG. 1, the entrance angle reducing optical system 80 is actualized by a pair of concave lenses 81 and 82 disposed in a color separation optical system 40 discussed below. The use of the entrance angle reducing optical system 80 reduces the 'entrance angle θ' of the incident light rays that enter the liquid crystal panels 51R, 51G, and 51B. This arrangement effectively reduces the chrominance nonuniformities and improves the contrast.

As shown in FIG. 1, the projector 2A of the first embodiment includes the color separation optical system 40 that separates a light beam W emitted via the uniform illumination optical system 20 of the illumination system 1A into color light beams of red, green, and blue R, G, and B, the three liquid crystal panels 51R, 51G, and 51B functioning as the modulation devices that modulate the respective color light beams, the prism 61 functioning as a light composition optical system 60 that synthesizes the modulated beams to a composite light beam, and a projection lens 71 functioning as a projection optical system that magnifies and projects the composite light beam onto the screen S. The projector 2A also has a relay lens system 90 that leads the blue light beam B among the respective color light beams separated by the color separation optical system 40 to the corresponding liquid crystal panel 51B.

The color separation optical system 40 includes a blue-green reflection dichroic mirror 41, a green reflection dichroic mirror 42, and a reflecting mirror 43. The blue-green reflection dichroic mirror 41 causes the blue light beam B and the green light beam G, which are included in the light beam W emitted from the uniform illumination optical system 20, to be reflected in a perpendicular direction to go towards the green reflection dichroic mirror 42. The red light beam R transmits the blue-green reflection dichroic mirror 41 and reflects off the rear reflecting mirror 43 in a substantially perpendicular direction and emits from a red light outgoing section 44 towards the color composition optical system (the prism 61).

The green reflection dichroic mirror 42 causes only the green light beam G out of the blue and green light beams B and G reflected by the blue-green reflection dichroic mirror 41 to be reflected in a substantially perpendicular direction and emitted from a green light outgoing section 45 towards the prism 61. The blue light beam B transmitting through this green reflection dichroic mirror 42 is emitted from a blue light outgoing section 46 towards the relay lens system 90. In the arrangement of this embodiment, the layout of the optical elements is determined to attain substantially equal distances from a light outgoing section of the uniform illumination optical system 20 to the respective color light outgoing sections 44, 45, and 46 of the color separation optical system 40. In the structure of the embodiment, condensing lenses 101 and 102, which are planoconvex lenses, are disposed on the respective light-outgoing sides of the red light outgoing section 44 and the green light outgoing section 45 of the color separation optical system 40. The red light beam R and the green light beam G emitted from the respective light outgoing sections 44 and 45 enter the condensing lenses 101 and 102 to be parallelized.

The red light beam R and the green light beam G thus parallelized respectively pass through non-illustrated polarizing plates to have the adjusted polarizing directions and subsequently enter the liquid crystal panels 51R and 51G, which are disposed immediately after the condensing lenses 101 and 102, to be modulated. Pieces of image information corresponding to the respective color light beams are then added. The liquid crystal panels 51R and 51G are under switching control, which is performed by a non-illustrated drive unit according to the image information, and modulate the respective color light beams passing therethrough. The drive unit has a known mechanism and is not specifically described in this embodiment.

The blue light beam B, on the other hand, passes through the relay lens system 90 and passes through a non-illustrated polarizing plate to have the adjusted polarizing direction, and subsequently enters the corresponding liquid crystal panel 51B. In the same manner as the other color light beams, the blue light beam B is modulated according to image information. The liquid crystal panels 51R, 51G, and 51B of this embodiment use polysilicon TFT as switching elements.

The relay lens system 90 includes a light-incoming side reflecting mirror 91, a light-outgoing side reflecting mirror 92, a middle lens 93 disposed therebetween, and a pair of condensing lenses 103 and 104. The blue light beam B has the longest optical path, that is, the longest distance between the light source lamp 11 and the corresponding liquid crystal panel, and accordingly has a greatest loss of light quantity. The use of the relay lens system 90 in this embodiment effectively reduces the loss of light quantity. The red light beam or the green light beam may alternatively be passed through the relay lens system 90.

Out of the respective color light beams modulated through the liquid crystal panels 51R, 51G, and 51B, only the light beams of one polarizing direction passing through the non-illustrated polarizing plates enter the prism 61 to be synthesized to a composite light beam. The prism 61 used as the color composition optical system 60 (see FIG. 2) in this embodiment is a dichroic prism, which includes two dichroic films arranged in an X shape along the interfaces of four prism elements. Other available examples of the color composition optical system 60 include a cross mirror including two dichroic mirrors arranged in an X shape and a mirror composition system having two dichroic mirrors separately arranged.

In the arrangement of this embodiment, the light rays emitted from the uniform illumination optical system 20 are converged as a whole as shown in FIG. 2. The term 'converged as a whole' means that the outer-most light rays among all the partial light beams approach the optical axis of the optical system. The entrance angle reducing optical system 80 causes the light rays emitted from the uniform illumination optical system 20 and converged as a whole to be a bundle of parallel light as a whole. The term 'parallel as a whole' means that the outer-most light rays among all the partial light rays are parallel to the optical axis of the optical system.

As discussed above, in the illumination system 1A of this embodiment, the light rays from the uniform illumination optical system 20 are emitted to be converged as a whole. The light rays from the uniform illumination optical system 20 may be emitted alternatively to be diverged as a whole, instead of being converged as a whole. The arrangement of emitting the light rays from the uniform illumination optical system 20 to be converged as a whole, however, desirably reduces the size of the subsequent system, that is, the entrance angle reducing optical system 80.

The light rays from the entrance angle reducing optical system 80 are emitted to be a bundle of parallel light as a whole. The width of the bundle of light emitted from the entrance angle reducing optical system 80 may alternatively be increased or decreased towards the light crystal panel 51. The entrance angle reducing optical system 80 may have any arrangement as long as it reduces the entrance angle of the incident light rays emitted from the condenser lens 23 functioning as the superimposing lens and enter the liquid crystal panel 51, compared with the illumination system without any entrance angle reducing optical system.

Figure 3:
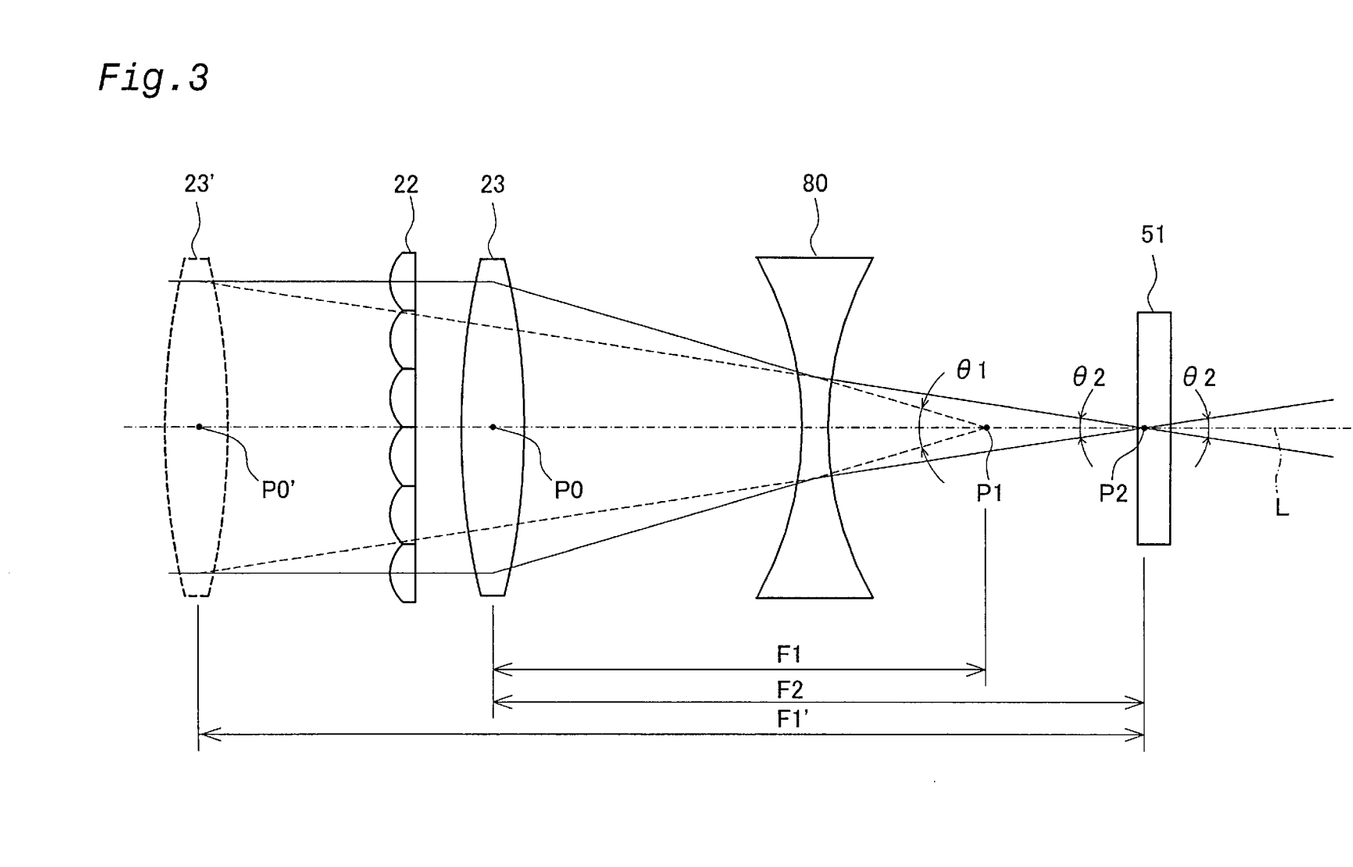
FIG. 3 shows a main part of the optical system of FIG. 2.

FIG. 3 shows the main part of the optical system of FIG. 2. The illustration of FIG. 3 includes only the second lens array 22, the condenser lens 23, the entrance angle reducing optical system 80, and the liquid crystal panel 51. The loci of the light rays parallel to the light source optical axis L and pass through the centers of the outer-most small lenses included in the second lens array 22 are also illustrated in FIG. 3.

As shown in FIG. 3, the light rays substantially in parallel with the light source optical axis L pass through the second lens array 22 and subsequently the condenser lens 23 and converge at a point P1. A distance between a point P0, where the condenser lens 23 is disposed, and the point P1 corresponds to a focal length F1 of the condenser lens 23. The light rays passing through the condenser lens 23 and entering the entrance angle reducing optical system (the concave lens) 80 are refracted by the concave lens and converged at a point P2 in the liquid crystal panel 51. The condenser lens 23 and the concave lens 80 accordingly constitute a telephoto lens system that converges the incident light rays, which enter substantially in parallel with the light source optical axis L, on the point P2. A focal length F2 of this telephoto lens system is equal to the distance between the points P0 and P2. As clearly understood from FIG. 3, the use of the entrance angle reducing optical system 80 enables the liquid crystal panel 51 to be irradiated at a smaller entrance angle θ2 than an entrance angle θ1 in the arrangement where the liquid crystal panel 51 is irradiated directly with the light rays emitted from the condenser lens 23.

To attain the relatively small entrance angle θ2 (see FIG. 3) without using the entrance angle reducing optical system 80 like the background projector (see FIG. 10), a condenser lens 23' having a relatively long focal length F1' should be disposed at a point P0'. This arrangement, however, undesirably increases the distance between the condenser lens 23' and the liquid crystal panel 51, thereby making the whole projector rather bulky. The arrangement of this embodiment reduces the entrance angle and thereby ensures the size reduction of the projector.

Figure 4:
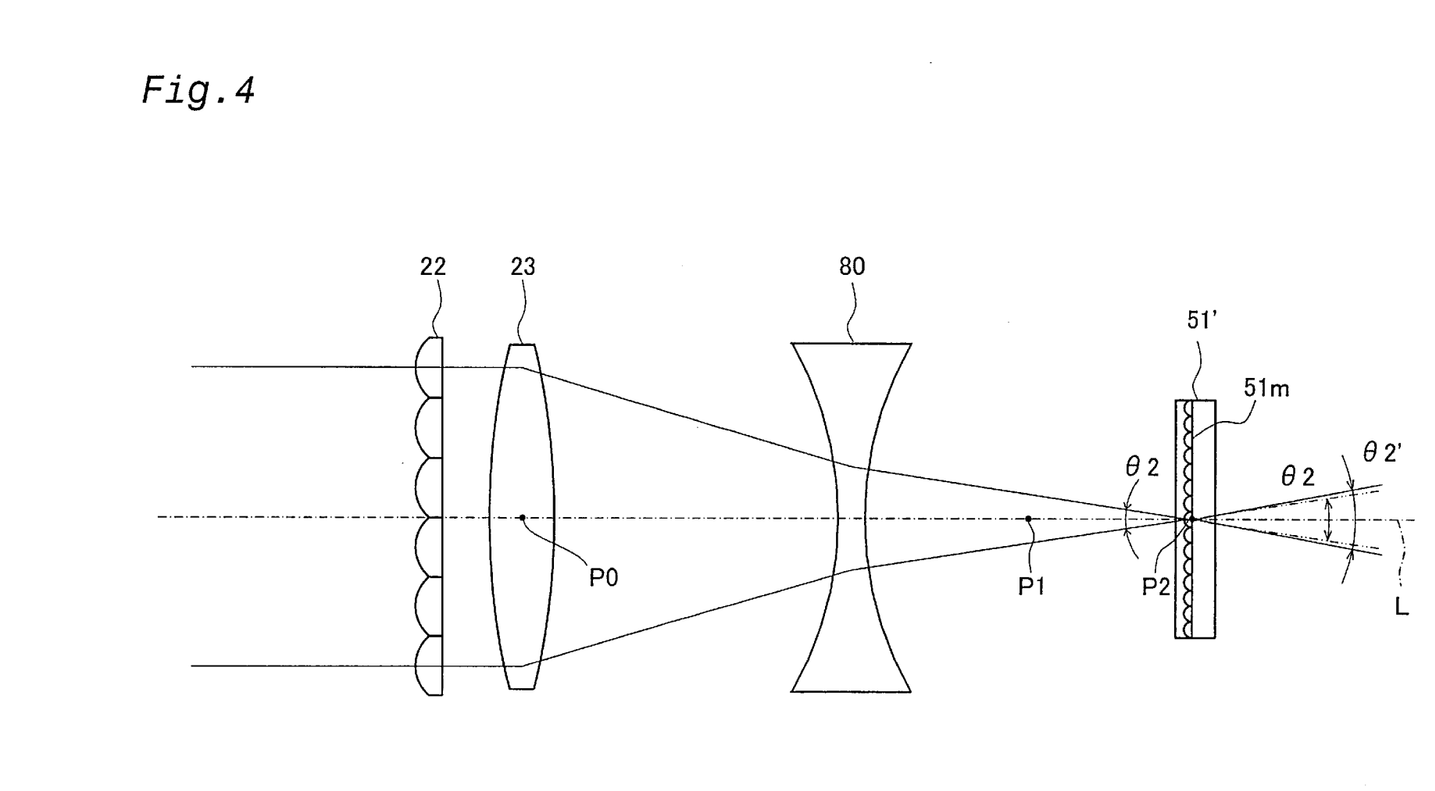
FIG. 4 shows the loci of light rays in an arrangement that a liquid crystal panel includes a microlens array.

The liquid crystal panel may include a microlens array that enables the incident light of the liquid crystal panel to appropriately enter the respective pixels. FIG. 4 shows the loci of the light rays in an arrangement that a liquid crystal panel 51' includes a microlens array 51m. Like FIG. 3, the illustration of FIG. 4 shows the loci of the light rays in parallel with the light source optical axis L and which pass through the centers of the outer-most small lenses included in the second lens array 22. As shown in FIG. 4, the light rays enter the liquid crystal panel 51' at the entrance angle θ2 like in the case of FIG. 3, but the light rays are emitted from the liquid crystal panel 51' at an angular difference θ2', which is greater than θ2. In the case where the liquid crystal panel 51' includes the microlens array 51m, the width of the light rays emitted from the liquid crystal panel 51' is wider than the width of the incident light rays. The use of the entrance angle reducing optical system 80 of the embodiment, however, reduces the entrance angle θ2 of the incident light rays that enter the liquid crystal panel 51' and accordingly the angular difference θ2' of the light rays emitted from the liquid crystal panel 51'. This arrangement enables the light rays emitted from the liquid crystal panel 51' to appropriately enter the pupil of the projection lens 71 (see FIG. 1), thus ensuring the sufficient brightness of the projected image.

As described above, the arrangement of this embodiment has the entrance angle reducing optical system 80, such as the concave lenses 81 and 82, to reduce the 'entrance angle θ' of the incident light rays that enter the liquid crystal panel 51 or 51'. This accordingly reduces the chrominance non-uniformities and improves the contrast. This arrangement also ensures reduction of the diameter of the projection lens 71.

The condenser lens 23 of this embodiment corresponds to the superimposing lens of the present invention. The uniform illumination optical system 20 of this embodiment accordingly includes the first lens array and the superimposing lens of the present invention.

Second Embodiment

Figure 5:
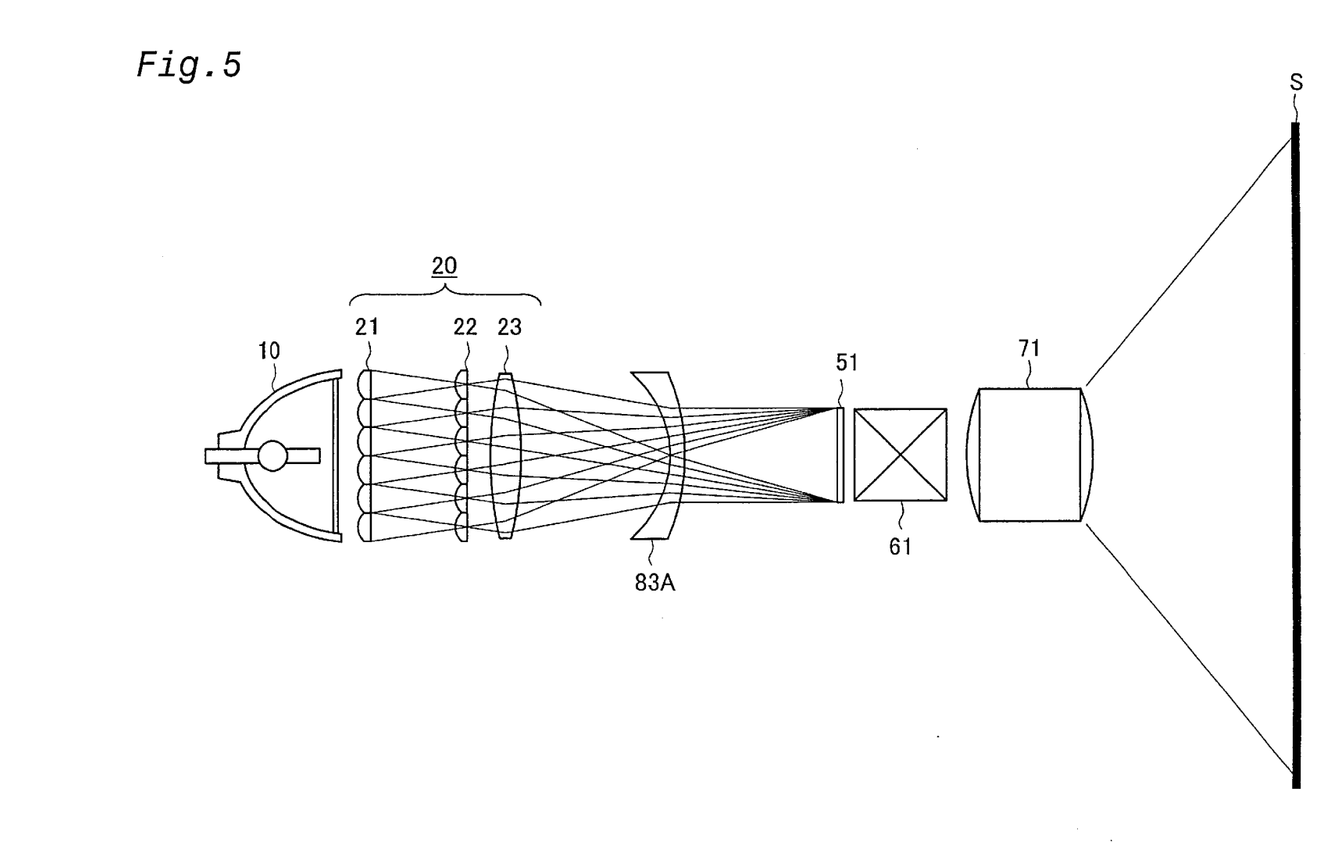
FIG. 5 schematically illustrates another projector in a second embodiment according to the present invention.
Figure 6:
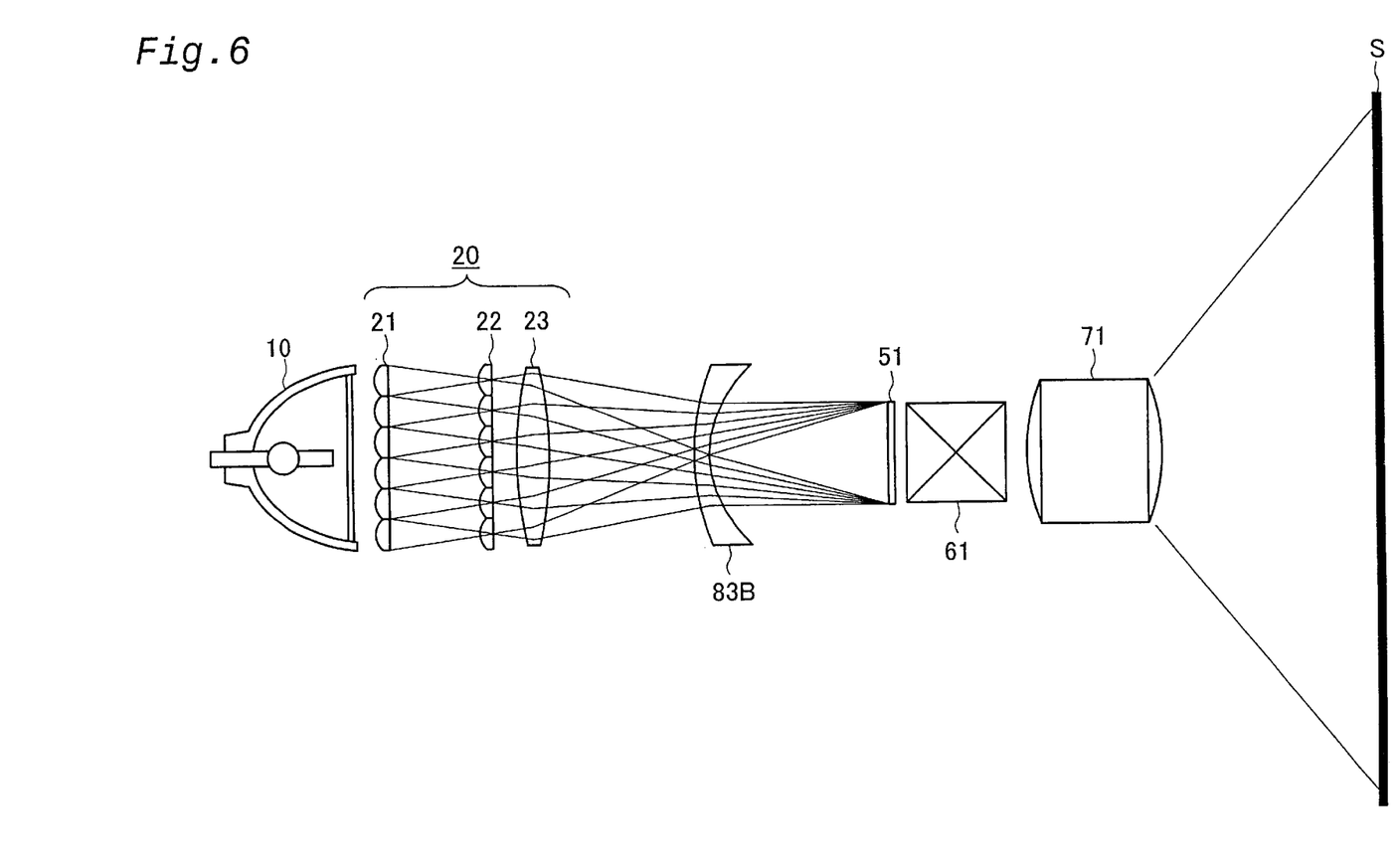
FIG. 6 shows one modification of the projector of the second embodiment.

FIG. 5 schematically illustrates another projector in a second embodiment according to the present invention. FIG. 6 shows one modification of the projector of the second embodiment. In the embodiments discussed below, like numerals denote like elements fulfilling the similar functions to those discussed in the first embodiment (FIGS. 1 and 2), and the overlapping explanation is appropriately omitted.

The structure of the second embodiment has a negative (diverging) meniscus lens 83A, which is a concavo-convex lens having a convex face on the side of the observation (that is, on the side of the liquid crystal panel 51), as the entrance angle reducing optical system.

As shown in FIG. 6, a meniscus lens 83B may be arranged to have a concave face on the side of the observation.

The arrangement of the second embodiment exerts the same advantages as those of the first embodiment. The use of the meniscus lens 83A or 83B decreases the aberration and ensures the efficient illumination. The increased degree of freedom in the arrangement of the lenses as shown in FIG. 5 or 6 ensures the efficient layout free from the interference of other optical elements and the positional restriction, thereby enabling the size reduction of the projector. For example, in the case where the concave lens 81 interferes with the reflecting mirror 43 in the arrangement of FIG. 1, the concave lens 81 is replaced with the meniscus lens 83A (see FIG. 5) having the convex face on the side of the reflecting mirror 43. This effectively prevents the interference of the reflecting mirror 43.

Third Embodiment

Figure 7:
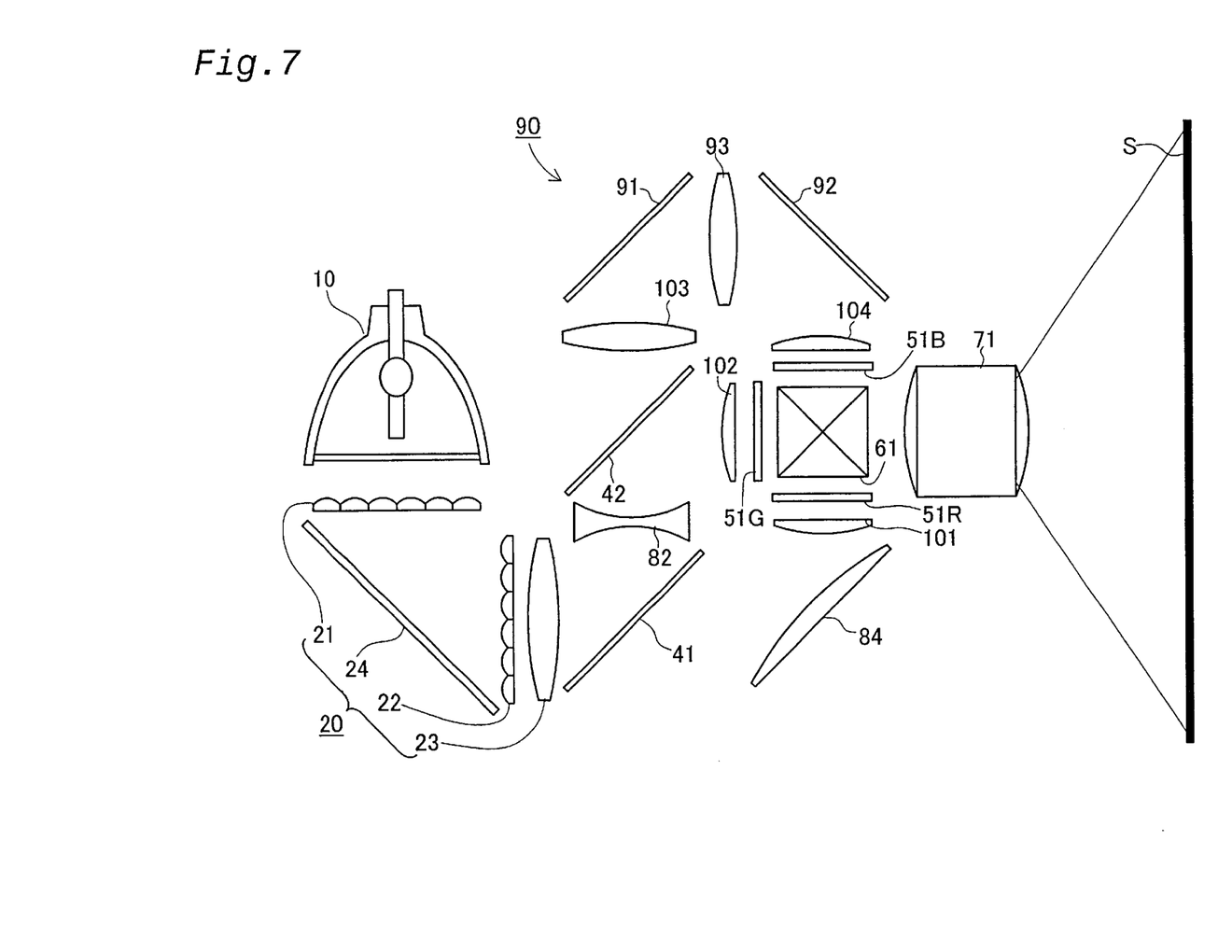
FIG. 7 schematically illustrates still another projector in a third embodiment according to the present invention.

FIG. 7 schematically illustrates still another projector in a third embodiment according to the present invention. The structure of the third embodiment has a convex mirror 84, in place of the concave lens 81 and the reflecting mirror 43 in the arrangement of FIG. 1. The arrangement of the third embodiment exerts the same advantages as those of the first embodiment and further reduces the number of optical parts, thereby reducing the manufacturing cost.

Fourth Embodiment

Figure 8:
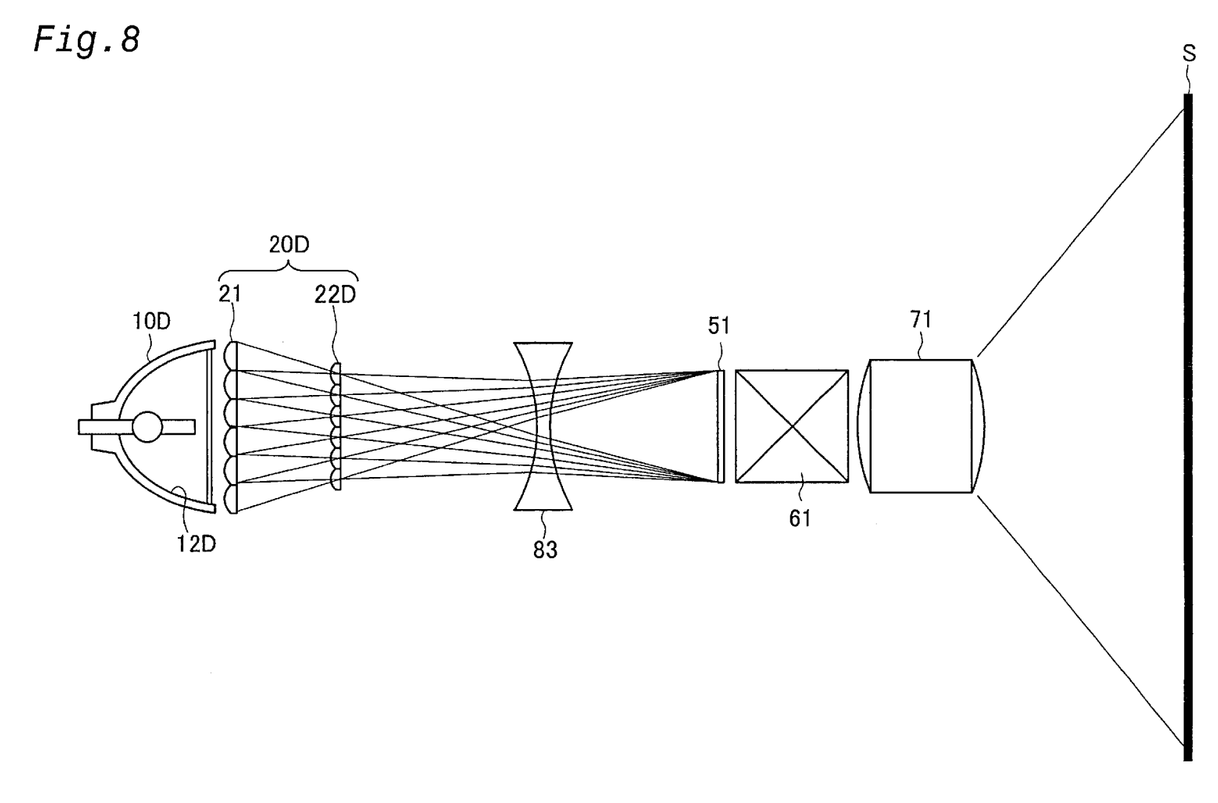
FIG. 8 schematically illustrates another projector in a fourth embodiment according to the present invention.

FIG. 8 schematically illustrates another projector in a fourth embodiment according to the present invention. The structure of the fourth embodiment uses an ellipsoidal mirror as a reflector 12D of a light source 10D to emit the converged beam. The dimensions of each rectangular lens included in a second lens array 22D are accordingly set smaller than the dimensions of each rectangular lens included in a first lens array 21D. The arrangement of the fourth embodiment exerts the same advantages as those of the first embodiment and ensures the size reduction of the illumination system with a light source having a large quantity of light and a relatively bulky reflector.

In the first through the third embodiments discussed above, the uniform illumination optical system 20 includes the first lens array 21, the second lens array 22, and the condenser lens 23. The condenser lens 23 has the superimposing function, whereas the second lens array 22 makes the axes of the partial light rays parallel to the optical axis of the optical system. The arrangement of the fourth embodiment does not include a condenser lens, and the second lens array 22D accordingly fulfills the superimposing function.

Fifth Embodiment

Figure 9:
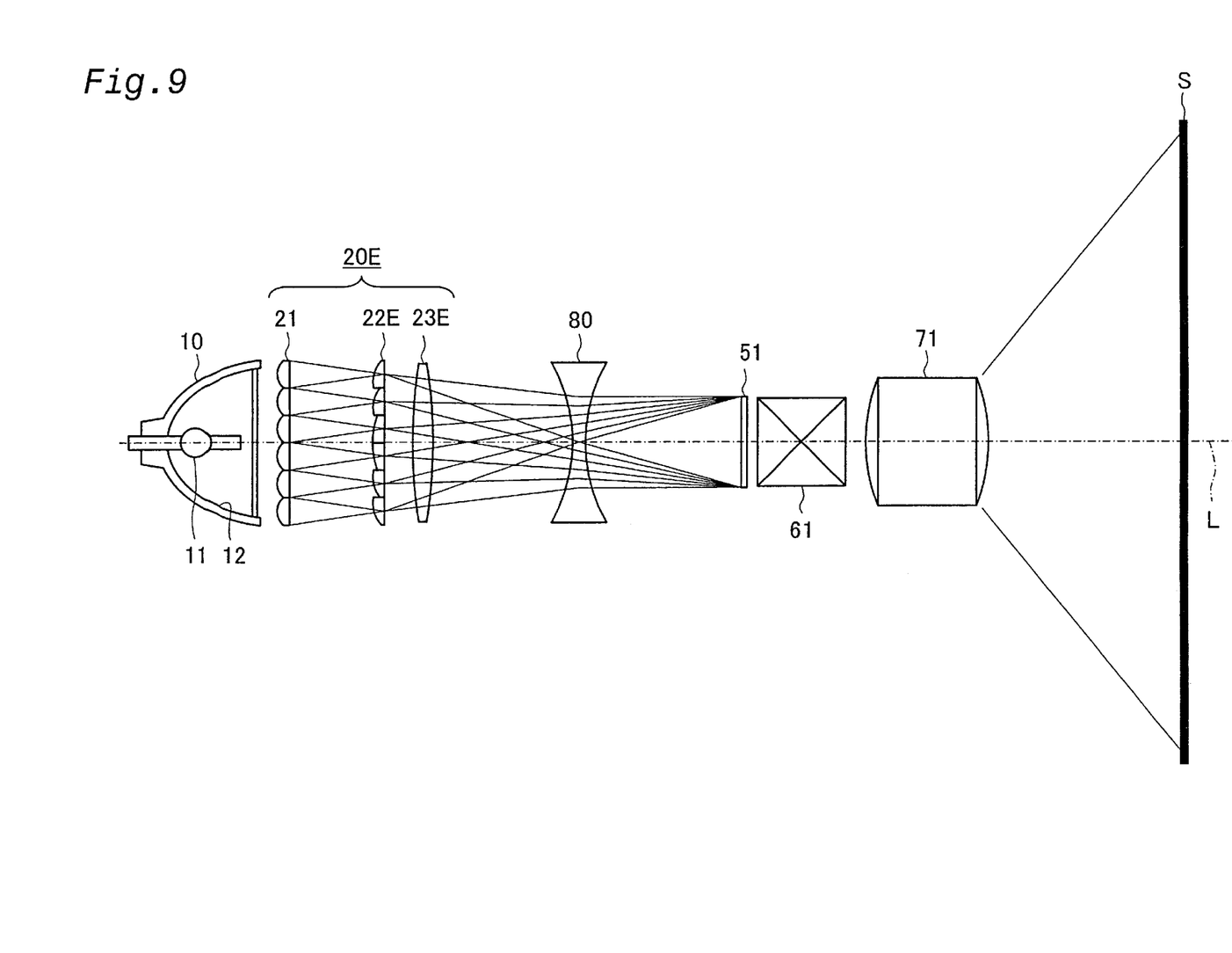
FIG. 9 schematically illustrates still another projector in a fifth embodiment according to the present invention.

FIG. 9 schematically illustrates still another projector in a fifth embodiment according to the present invention. The fifth embodiment has a different uniform illumination optical system from that of the projector of the first embodiment shown in FIG. 1. A uniform illumination optical system 20E of the fifth embodiment includes a first lens array 21, a second lens array 22E, and a condenser lens 23E. Like the first through the fourth embodiments discussed above, the second lens array 22E has a plurality of small lenses provided corresponding to the first lens array. In the first through the fourth embodiments, none of the small lenses included in the first lens array 21, the second lens arrays 22 and 22D is decentered. In the fifth embodiment, on the other hand, the respective small lenses included in the second lens array 22E are decentered. The second lens array 22E of the fifth embodiment is obtained, for example, by applying the shape of the Fresnel lens to each of the small lenses included in the second lens array. The second lens array 22E including the decentered small lenses, in addition to the condenser lens 23E, has the function of the superimposing lens of the present invention. The use of the second lens array 22E including the decentered small lenses effectively decreases the thickness of the condenser lens 23E and thereby reduces the weight of the whole projector.

The second lens array may have varying decentering of the respective small lenses, so as to decrease the spherical aberration.

In the structure of the fifth embodiment, the second lens array 22E including the decentered small lenses and the condenser lens 23E function as the superimposing lens. One possible modification omits the condenser lens and causes only the second lens array including the decentered small lenses to attain the function of the superimposing lens. Namely the superimposing lens of the present invention may be a second lens array including decentered small lenses.

Modifications

The present invention is not restricted to the embodiments discussed above, but there may be many modifications and changes.

(1) The above embodiments regard the projectors including transmissive liquid crystal panels. The technique of the present invention is, however, also applicable to projectors including reflective liquid crystal panels.

(2) The above embodiments regard the projectors that project and display color images. The projectors may, however, be those capable of displaying only monochromatic images. The color separation optical system 40 and the color composition optical system 60 included in the projector displaying color images are omitted from the projector displaying only monochromatic images.

(3) The technique of the fourth embodiment is applicable to the arrangement where a condensing lens is disposed between the light source 10, which emits a parallel light beam as in the case of the first through the third embodiments, and the first lens array 21 and the arrangement where the light source emits a parallel light beam and a condensing lens is disposed between the first lens array 21 and the second lens array 22.

(4) The meniscus lens used in the second embodiment or the convex mirror used in the third embodiment may be applied for the entrance angle reducing optical system 80 of the fourth and the fifth embodiments.

(5) The fifth embodiment (FIG. 9) uses a decentered lens array for the second lens array 22E. The second and the third embodiments may also use a decentered lens array for the second lens array. This arrangement has the same advantages as those of the fifth embodiment, that is, the thinner condenser lens.

(6) In the case where the entrance angle reducing optical system 80 includes a plurality of lenses or convex mirrors, identical lenses or convex mirrors may be applicable. Alternatively, a combination of different optical elements, for example, a combination of a concave lens and a meniscus lens, may constitute the entrance angle reducing optical system 80.

(7) In the first through the fifth embodiments discussed above, only one concave lens, meniscus lens, or convex mirror may work as the entrance angle reducing optical system 80. The entrance angle reducing optical system 80 may, however, include a plurality of optical elements selected among a diversity of lenses and mirrors.

The condensing lenses 101, 102, and 104 are disposed respectively in the vicinity of the light-entering faces of the three liquid crystal panels 51R, 51G, and 51B in FIG. 1. The condensing lenses 101, 102, and 104 have the function of parallelizing the incident beams that enter the liquid crystal panels as discussed previously, in other words, the function of reducing the entrance angle. From that point of view, these lenses can be regarded as the entrance angle reducing system. The decrease in entrance angle by the condensing lenses 101, 102, and 104 is, however, negligible compared with the decrease in entrance angle by the concave lenses 81 and 82. The entrance angle reducing system in the specification hereof accordingly represents the 'entrance angle reducing system in a narrow sense', which includes at least one lens or convex mirror other than the condensing lenses 101, 102, and 104 disposed in the vicinity of the light-entering faces of the liquid crystal panels.

The illumination system of the present invention is applicable to a diversity of projectors. The projector of the present invention is applied to project and display images output from a computer and images output from a video recorder on a screen.

Obviously, numerous modifications and variations of the present invention are possible in light of the above teachings. It is therefore to be understood that within the scope of the appended claims, the invention may be practiced otherwise than as specifically described herein.

What is claimed is:

1. An illumination system for illuminating a modulation device which modulates light according to image information, comprising:
    a light source configured to emit a light beam along a light source optical axis;
    a first lens array having a plurality of small lenses configured to divide the light beam emitted from said light source into a plurality of partial light beams;
    a superimposing lens configured to superimpose the plurality of partial light beams emitted from said first lens array on said modulation device; and
    an entrance angle reducing system disposed between said superimposing lens and said modulation device, and configured to reduce an entrance angle of a light bundle including light rays from each of said plurality of small lenses of said first lens array, said light bundle being emitted from said superimposing lens and entering said modulation device via said entrance angle reducing system, said entrance angle representing an angular difference of incident light rays constituting said light bundle at one point on said modulation device, compared with an illumination system without said entrance angle reducing system.

2. The illumination system according to claim 1, wherein said superimposing lens and said entrance angle reducing system form a telephoto lens system configured to cause light rays that enter said superimposing lens substantially in parallel with the light source optical axis to be converged on said modulation device.

3. The illumination system according to claim 2, wherein said entrance angle reducing system comprises a concave lens.

4. The illumination system according to claim 2, wherein said entrance angle reducing system comprises a meniscus lens.

5. The illumination system according to claim 1, wherein said entrance angle reducing system comprises a convex mirror.

6. The illumination system according to claim 1, wherein said superimposing lens comprises a second lens array having a plurality of small lenses corresponding to the small lenses of said first lens array, and
    wherein at least one of said small lenses of said second lens array comprises a decentered small lense.

7. The illumination system according to claim 1, wherein said light source comprises a reflector having an ellipsoidal reflecting surface configured to emit a light beam that travels while being converged along the light source optical axis, and
    wherein said superimposing lens comprises a second lens array having a plurality of small lenses corresponding to the small lenses of said first lens array, each small lens included in said second lens array having dimensions smaller than the corresponding small lens in said first lens array.

8. The illumination system according to claim 1, wherein the light beam from said superimposing lens is emitted to be converged as a whole, and
    wherein the light beam from said entrance angle reducing system is emitted to be a bundle of parallel light as a whole.

9. A projector, comprising:
    a light source configured to emit a light beam along a light source optical axis;
    a color separator configured to separate the light beam emitted from said light source into three color light beams;
    first through third modulation devices configured to respectively modulate the three color light beams separated by said color separator according to image information;
    a color synthesizer configured to synthesize beams modulated by said first through third modulation devices;
    a projection lens configured to project a light beam synthesized by said color synthesizer;
    a first lens array having a plurality of small lenses configured to divide the light beam emitted from said light source into a plurality of partial light beams;
    a superimposing lens configured to superimpose the plurality of partial light beams emitted from said first lens array on said first through third modulation devices; and
    an entrance angle reducing system disposed between said superimposing lens and said first through third modulation devices, and configured to reduce an entrance angle of a light bundle including light rays from each of said plurality of small lenses of said first lens array, said light bundle being emitted from said superimposing lens and entering one of said first through third modulation devices via said entrance angle reducing system, said entrance angle representing an angular difference of incident light rays constituting said light bundle at one point on said modulation device, compared with an illumination system without said entrance angle reducing system.

10. The projector according to claim 9, wherein said superimposing lens and said entrance angle reducing system form a telephoto lens system configured to cause light rays that enter said superimposing lens substantially in parallel with the light source optical axis to be converged on said first through third modulation devices.

11. The projector according to claim 10, wherein said entrance angle reducing system comprises a concave lens.

12. The projector according to claim 10, wherein said entrance angle reducing system comprises a meniscus lens.

13. The projector according to claim 9, wherein said entrance angle reducing system comprises a convex mirror.

14. The projector according to claim 10, wherein said color separator comprises:
   a first color separator configured to separate the light beam emitted from said light source into a first color light beam and a residual color light beam; and
   a second color separator configured to separate the residual color light beam into a second color light beam and a third color light beam, and
   wherein said entrance angle reducing system comprises:
      a first entrance angle reduction element disposed in an optical path of the first color light beam separated by said first color separator; and
      a second entrance angle reduction element disposed in an optical path of the residual color light beam separated by said first color separator.

15. The projector according to claim 9, wherein said superimposing lens comprises a second lens array having a plurality of small lenses corresponding to the small lenses of said first lens array, and
   wherein at least one of said small lenses of said second lens array comprises a decentered small lense.

16. The projector according to claim 9, wherein said light source comprises a reflector having an ellipsoidal reflecting surface configured to emit a light beam that travels while being converged along the light source optical axis, and
   wherein said superimposing lens comprises a second lens array having a plurality of small lenses corresponding to the small lenses of said first lens array, each small lens included in said second lens array having dimensions smaller than the corresponding small lens in said first lens array.

17. The projector according to claim 9, wherein each of said first to third modulation devices is a liquid crystal panel including a microlens array.

18. The projector according to claim 9, wherein the light beam from said superimposing lens is emitted to be converged as a whole, and
   wherein the light beam from said entrance angle reducing system is emitted to be a bundle of parallel light as a whole.

19. A projector, comprising:
   an illumination system;
   a modulation device configured to modulate light emitted from said illumination system according to image information; and
   a projection lens configured to project and magnify the modulated light emitted from said modulation device, wherein said illumination system comprises:
      a light source configured to emit a light beam along a light source optical axis;
      a lens array having a plurality of small lenses configured to divide the light beam emitted from said light source into a plurality of partial light beams;
      a superimposing lens configured to superimpose the plurality of partial light beams emitted from said lens array on said modulation device; and
      an entrance angle reducing system disposed between said superimposing lens and said modulation device, and configured to reduce an entrance angle of a light bundle including light rays from each of said plurality of small lenses of said lens array, said light bundle being emitted from said superimposing lens and entering said modulation device via said entrance angle reducing system, said entrance angle representing an angular difference of incident light rays constituting said light bundle at one point on said modulation device, compared with an illumination system without said entrance angle reducing system.

20. An illumination system, comprising:
   a light source configured to emit light;
   a lens array having a plurality of lenses configured to divide the light emitted from the light source into a plurality of partial lights;
   a superimposing lens configured to superimpose the plurality of partial lights emitted from the lens array on an area to be illuminated; and
   a concave lens disposed between the superimposing lens and the area to be illuminated, and configured to reduce an entrance angle of a light bundle including light rays from each of the plurality of lenses of the lens array, the light bundle being emitted from the superimposing lens and entering the area to be illuminated via the concave lens, the entrance angle representing an angular difference of incident light rays constituting the light bundle at one point on the area to be illuminated, compared with an illumination system without the concave lens.

21. An illumination system, comprising:
   a light source configured to emit light;
   a color separator configured to separate the light emitted from the light source into a plurality of color lights;
   a plurality of modulation devices respectively configured to modulate the plurality of color lights;
   a color synthesizer configured to synthesize the plurality of color lights modulated by the plurality of modulation devices;
   a projection lens configured to project a beam synthesized by the color synthesizer;
   a lens array having a plurality of lenses configured to divide the light emitted from the light source into a plurality of partial lights;
   a superimposing lens configured to superimpose the plurality of partial lights emitted from the lens array on the plurality of the modulation devices; and
   a concave lens disposed between the superimposing lens and the plurality of the modulation devices, and configured to reduce an entrance angle of a light bundle including light rays from each of the plurality of lenses of the lens array, the light bundles being emitted from the superimposing lens and entering one of the plurality of the modulation devices via the entrance angle reducing system, the entrance angle representing an angular difference of incident light rays constituting the light bundle at one point on the modulation device, compared with an illumination system without the entrance angle reducing system.

22. The projector according to claim 21, wherein the color separator includes a first color separator and a second color separator, and wherein the concave lens is disposed between the first color separator and the second color separator.

23. The projector according to claim 21, wherein the color separator includes a first color separator, a second color separator, and a reflection mirror, and wherein the concave lens is disposed between the first color separator and the reflection mirror.

* * * * *